(12) United States Patent
Biskeborn

(10) Patent No.: US 11,302,348 B2
(45) Date of Patent: *Apr. 12, 2022

(54) SPLIT BAND MULTICHANNEL MAGNETIC RECORDING HEAD HAVING SCALED READER WIDTHS

(71) Applicant: International Business Machines Corporation, Armonk, NY (US)

(72) Inventor: Robert Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,578

(22) Filed: May 20, 2020

(65) Prior Publication Data

US 2021/0366519 A1  Nov. 25, 2021

(51) Int. Cl.

| G11B 5/29 | (2006.01) |
|---|---|
| G11B 5/265 | (2006.01) |
| G11B 5/23 | (2006.01) |
| G11B 5/31 | (2006.01) |
| G11B 5/008 | (2006.01) |
| G11B 5/39 | (2006.01) |
| G11B 27/10 | (2006.01) |

(Continued)

(52) U.S. Cl.
CPC ...... *G11B 5/00826* (2013.01); *G11B 5/00878* (2013.01); *G11B 5/23* (2013.01); *G11B 5/265* (2013.01); *G11B 5/29* (2013.01); *G11B 5/3958* (2013.01); *G11B 5/1871* (2013.01); *G11B 5/313* (2013.01); *G11B 5/5926* (2013.01); *G11B 27/107* (2013.01)

(58) Field of Classification Search
None
See application file for complete search history.

(56) References Cited

U.S. PATENT DOCUMENTS 6,330,123 B1  12/2001  Schwarz et al.
6,545,837 B1   4/2003  Tran
(Continued)

FOREIGN PATENT DOCUMENTS

WO    9950834 A1   10/1999
WO  2005057554 A1    6/2005
WO  2011112181 A9    9/2011

OTHER PUBLICATIONS

Argumedo et al., "Scaling tape-recording areal densities to 100 GB/in2," IBM Journal of Research and Development, vol. 52, No. 4/5, Jul./Sep. 2008, pp. 513-527.

(Continued)

*Primary Examiner* — Craig A. Renner
(74) *Attorney, Agent, or Firm* — Zilka-Kotab, P.C.

(57) ABSTRACT

An apparatus, in accordance with one aspect of the present invention, includes an inner array of data transducers on a module, the data transducers of the inner array being aligned along a common axis that extends between distal ends of the module. Two outer arrays of data transducers are positioned to sandwich the inner array therebetween. Inner servo readers are positioned between the inner array and the outer arrays. Outer servo readers are positioned toward outer ends of the outer arrays. Widths of at least some of the outermost data transducers in the inner array are less than widths of at least some of the innermost data transducers in the inner array.

20 Claims, 17 Drawing Sheets

(51) Int. Cl.
*G11B 5/187* (2006.01)
*G11B 5/592* (2006.01)

(56) References Cited

U.S. PATENT DOCUMENTS

| | | |
|---|---|---|
| 7,110,210 B2 | 9/2006 | Saliba et al. |
| 7,153,366 B1 | 12/2006 | Chen et al. |
| 7,187,515 B2 | 3/2007 | Saliba |
| 7,307,809 B2 | 12/2007 | Neumann |
| 7,359,160 B2 | 4/2008 | Koga et al. |
| 7,391,587 B2 | 6/2008 | Dugas et al. |
| 7,414,811 B2 | 8/2008 | Biskeborn |
| 7,480,117 B2 | 1/2009 | Biskeborn et al. |
| 7,529,060 B2 | 5/2009 | Simmons, Jr. et al. |
| 7,570,450 B2 | 8/2009 | Koeppe |
| 7,602,579 B2 | 10/2009 | Biskeborn et al. |
| 7,675,710 B2 | 3/2010 | Hennecken et al. |
| 7,724,465 B2 | 5/2010 | Koeppe |
| 7,766,236 B2 | 8/2010 | Biskeborn et al. |
| 7,782,564 B2 | 8/2010 | Biskeborn et al. |
| 7,787,203 B2 | 8/2010 | Biskeborn et al. |
| 7,889,454 B2 | 2/2011 | Johnson et al. |
| 8,089,716 B2 | 1/2012 | Takayama et al. |
| 8,254,058 B2 | 8/2012 | Biskeborn |
| 8,432,635 B2 | 4/2013 | Fasen |
| 8,724,250 B2 | 5/2014 | Poorman et al. |
| 9,171,563 B1 | 10/2015 | Biskeborn |
| 9,177,580 B1 | 11/2015 | Vanderheyden et al. |
| 9,183,878 B2 | 11/2015 | Cherubini et al. |
| 9,251,825 B2 | 2/2016 | Biskeborn et al. |
| 9,300,284 B2 | 3/2016 | Biskeborn et al. |
| 9,653,114 B1 | 5/2017 | Biskeborn et al. |
| 9,947,354 B1 | 4/2018 | Harper |
| 10,199,060 B2 | 2/2019 | Biskeborn |
| 10,297,275 B2 | 5/2019 | Biskeborn et al. |
| 10,332,554 B1 | 6/2019 | Bui et al. |
| 10,354,679 B2 | 7/2019 | Biskeborn et al. |
| 10,902,882 B1* | 1/2021 | Biskeborn .......... G11B 5/00826 |
| 2003/0095353 A1 | 5/2003 | Nakao |
| 2003/0227702 A1 | 12/2003 | Watson et al. |
| 2005/0134989 A1 | 6/2005 | Girvin et al. |
| 2007/0047142 A1 | 3/2007 | Biskeborn |
| 2007/0047146 A1 | 3/2007 | Biskeborn et al. |
| 2007/0097556 A1* | 5/2007 | Biskeborn et al. .. G11B 5/3967 360/317 |
| 2008/0030886 A1 | 2/2008 | Biskeborn et al. |
| 2008/0088963 A1* | 4/2008 | Biskeborn et al. .......... G11B 5/00826 360/121 |
| 2008/0137235 A1 | 6/2008 | Biskeborn et al. |
| 2008/0291566 A1 | 11/2008 | Biskeborn et al. |
| 2009/0073603 A1 | 3/2009 | Koeppe |
| 2009/0109566 A1 | 4/2009 | Tanaka et al. |
| 2009/0213493 A1 | 8/2009 | Bui et al. |
| 2010/0079896 A1* | 4/2010 | Biskeborn et al. .......... G11B 5/00826 360/71 |
| 2010/0177436 A1 | 7/2010 | Bui et al. |
| 2011/0199703 A1 | 8/2011 | Hansen et al. |

OTHER PUBLICATIONS

Biskeborn, R. G., U.S. Appl. No. 16/553,013, filed Aug. 27, 2019.
Non-Final Office Action from U.S. Appl. No. 16/553,013, dated Feb. 6, 2020.
Final Office Action from U.S. Appl. No. 16/553,013, dated May 13, 2020.
Biskeborn, R. G., U.S. Appl. No. 16/405,589, filed May 7, 2019.
Restriction Requirement from U.S. Appl. No. 16/405,589, dated Nov. 26, 2019.
Non-Final Office Action from U.S. Appl. No. 16/405,589, dated Feb. 12, 2020.
Feldman et al., "Shingled Magnetic Recording Areal Density Increase Requires New Data Management," usenix File Systems, ;login:, vol. 38, No. 3, Jun. 2013, pp. 22-30.
He et al., "SMaRT: An Approach to Shingled Magnetic Recording Translation," 15th USENIX Conference on File and Storage Technologies, 2017, pp. 121-133.

* cited by examiner

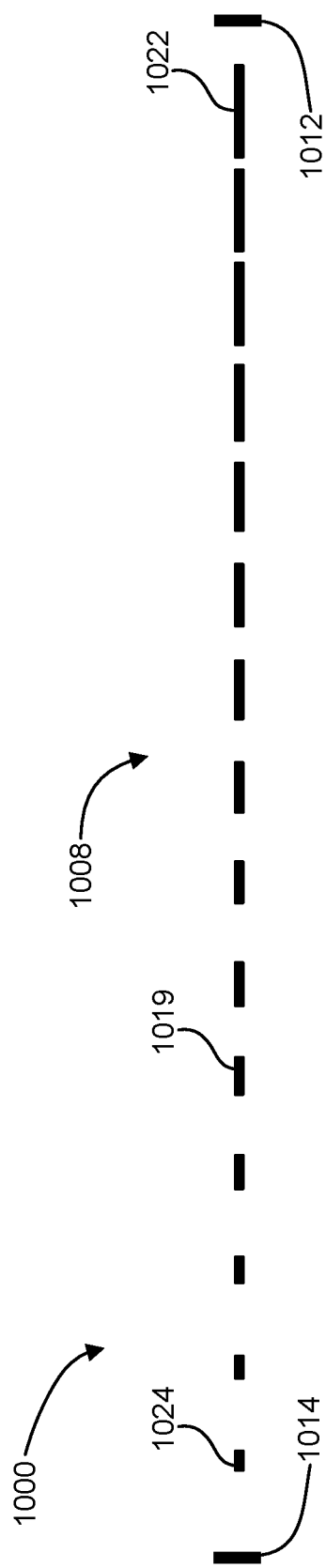
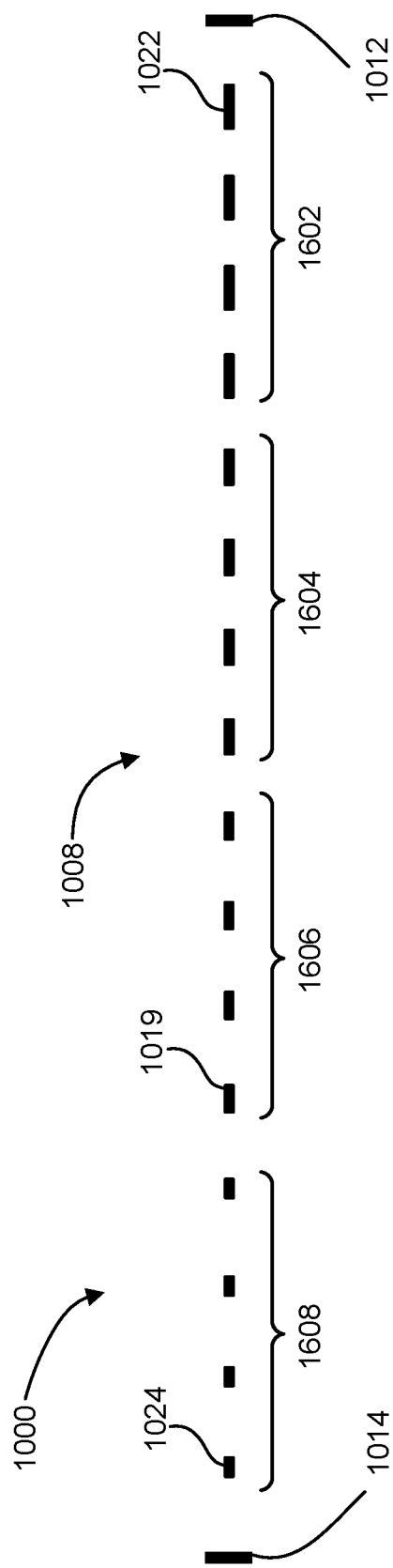

SPLIT BAND MULTICHANNEL MAGNETIC RECORDING HEAD HAVING SCALED READER WIDTHS

BACKGROUND

The present invention relates to data storage systems, and more particularly, this invention relates to magnetic heads for magnetic recording tape, and related systems.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability. For example, increasing linear bit density dramatically increases vulnerability to spacing loss.

Some of the difficulties encountered when attempting to increase the number of concurrent channels in heads to enable increase in data rate per unit of tape speed are as follows. Conventionally, added channels are required to fit in the space between legacy servo readers to read and/or write within a single data band. This is done to preserve backward compatibility and ensure tape dimensional stability (TDS) problems do not increase. Thus, when channels are added to a given width (e.g., a data band width), the pitch between channels must be reduced. However, tighter pitch causes, for example, increase in crosstalk between writers, increase in writer coil resistance if thinner conductors are used, difficulty in managing greater congestion in the wiring layers, higher operating temperature due to the increased transducer density as well as higher coil resistance in writers or due to higher needed current due to removal of turns, etc. Moreover, as magnetic media goes to smaller magnetic particles in an effort to increase signal to noise ratio, more write flux is needed to penetrate the tape, which in turn requires generation of more field by the coils.

The quantity of data stored on a magnetic tape may be increased by increasing the number of data tracks across the tape. More tracks are made possible by reducing feature sizes of the readers and writers, such as by using thin-film fabrication techniques and MR sensors. However, the feature sizes of readers and writers cannot be arbitrarily reduced. Factors such as lateral tape motion transients and tape lateral expansion and contraction must be balanced with reader/writer sizes that provide acceptable written tracks and readback signals. One particular problem limiting areal density is misregistration caused by tape lateral expansion and contraction. Tape width can vary by up to about 0.1% due to expansion and contraction caused by changes in humidity, tape tension, temperature, etc.

Thus, while the transducer array width does not change, the spacing of the data tracks on the tape will vary as the tape expands and contracts. Ideally, the reader track width would be as wide as the data track being read; this would provide the best signal. However, sensor track widths cannot be made as wide as the data tracks, because the sensors would read adjacent tracks upon expansion or contraction of the tape and/or due to lateral misregistration between tape and head. Accordingly, reader widths are currently designed to be substantially smaller than the data track width, and all readers in a given head have the same track width. The reader track width is selected to accommodate the worst-case scenarios, i.e., the designer takes into account maximum expansion/contraction and lateral misregistration when determining reader track width so that each sensor is over a given track at any time. FIGS. 20 and 21A-21B represent the effect of tape lateral expansion and contraction on reader position relative thereto. FIG. 20 shows a head 2000 relative to the tape 2002, where the tape has a nominal width. As shown, the readers 2004 are aligned with the data tracks 2006 on the tape 2002. FIG. 21A shows the effect of tape lateral contraction. As shown, the outermost readers 2008 are positioned along the outer edges of the outer data tracks. FIG. 21B shows the effect of tape lateral expansion. As shown, the outermost readers 2008 are positioned along the inner edges of the outer data tracks. Because all of the readers 2004 have the same width, the readback signal level from each reader will normally be the same.

SUMMARY

The apparatuses and methods presented herein address difficulties encountered when attempting to increase the number of concurrent channels in heads to enable increase in data rate per unit of tape speed.

An apparatus, in accordance with one aspect of the present invention, includes an inner array of data transducers on a module, the data transducers of the inner array being aligned along a common axis that extends between distal ends of the module. Two outer arrays of data transducers are positioned to sandwich the inner array therebetween. Inner servo readers are positioned between the inner array and the outer arrays. Outer servo readers are positioned toward outer ends of the outer arrays. Widths of at least some of the outermost data transducers in the inner array are less than widths of at least some of the innermost data transducers in the inner array.

As described herein, the foregoing configuration of data transducers enables a variety of operations, including, in various aspects, transducing data in multiple data bands using the inner and outer arrays, operating on legacy media using the inner array, etc.

Moreover, the relatively smaller widths of the outermost data transducers reduce misregistration of the outermost data transducers and the data tracks being read when tape lateral contraction or expansion is present.

In one approach, the transducer widths progressively decrease from the innermost data transducers to the outermost data transducers.

In another approach, the transducers are grouped into sets of greater than one transducer, the transducers in each set having widths that are about the same in that set, wherein the widths decrease from the innermost set to the outermost sets. Such an approach may be selected for processing considerations.

Similarly, in some approaches, widths of at least some of the outermost data transducers in each outer array are less than widths of at least some of the innermost data transducers in each outer array.

A method, in accordance with one aspect of the present invention, includes passing a magnetic recording tape having a plurality of data bands over a module having an inner array of data transducers on a module, the data transducers of the inner array being aligned along a common axis that extends between distal ends of the module. Two outer arrays of data transducers are positioned to sandwich the inner array therebetween. Inner servo readers are positioned between the inner array and the outer arrays. Outer servo readers are positioned toward outer ends of the outer arrays. Widths of at least some of the outermost data transducers in the inner array are less than widths of at least some of the innermost data transducers in the inner array. The method further includes simultaneously transducing data on two of the data bands using the data transducers of the inner and outer arrays.

Any of these aspects may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects of the present invention will become apparent from the following detailed description, which, when taken in conjunction with the drawings, illustrate by way of example the principles of the invention.

BRIEF DESCRIPTION OF THE DRAWINGS

FIG. 15 is a representational view of an outer array of the apparatus, in accordance with one approach.

FIG. 16 is a representational view of an outer array of the apparatus, in accordance with one approach.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred approaches of magnetic storage systems, as well as operation and/or component parts thereof.

In one general aspect, an apparatus includes an inner array of data transducers on a module, the data transducers of the inner array being aligned along a common axis that extends between distal ends of the module. Two outer arrays of data transducers are positioned to sandwich the inner array therebetween. Inner servo readers are positioned between the inner array and the outer arrays. Outer servo readers are positioned toward outer ends of the outer arrays. Widths of at least some of the outermost data transducers in the inner array are less than widths of at least some of the innermost data transducers in the inner array.

In another general aspect, a method includes passing a magnetic recording tape having a plurality of data bands over a module having an inner array of data transducers on a module, the data transducers of the inner array being aligned along a common axis that extends between distal ends of the module. Two outer arrays of data transducers are positioned to sandwich the inner array therebetween. Inner servo readers are positioned between the inner array and the outer arrays. Outer servo readers are positioned toward outer ends of the outer arrays. Widths of at least some of the outermost data transducers in the inner array are less than widths of at least some of the innermost data transducers in the inner array. The method further includes simultaneously transducing data on two of the data bands using the data transducers of the inner and outer arrays.

Figure 1A:
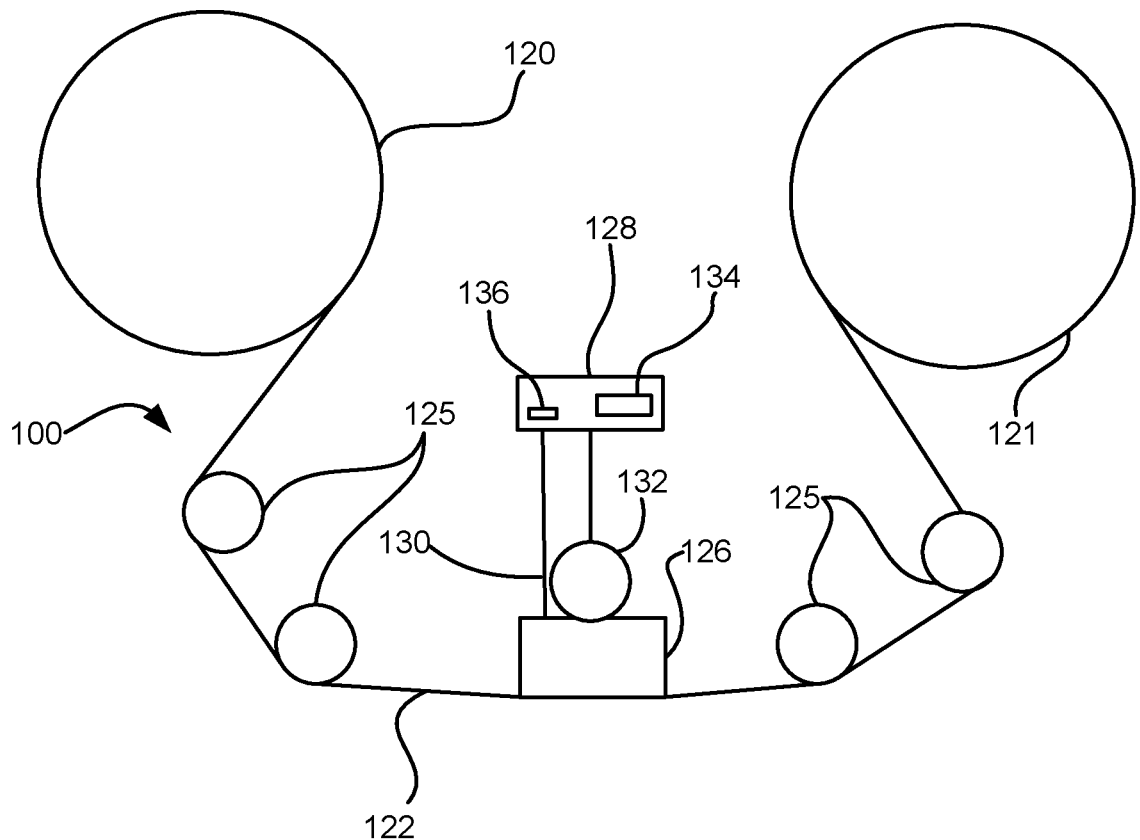
FIG. 1A is a schematic diagram of a simplified tape drive system, in accordance with one approach.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
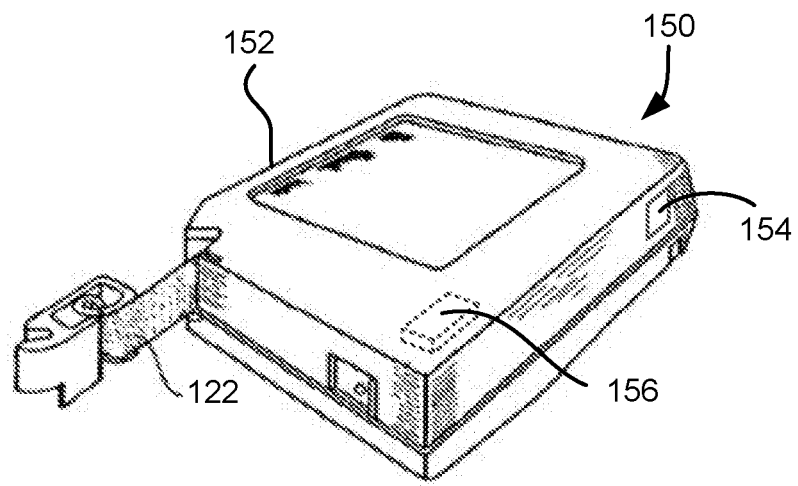
FIG. 1B is a schematic diagram of a tape cartridge, in accordance with one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
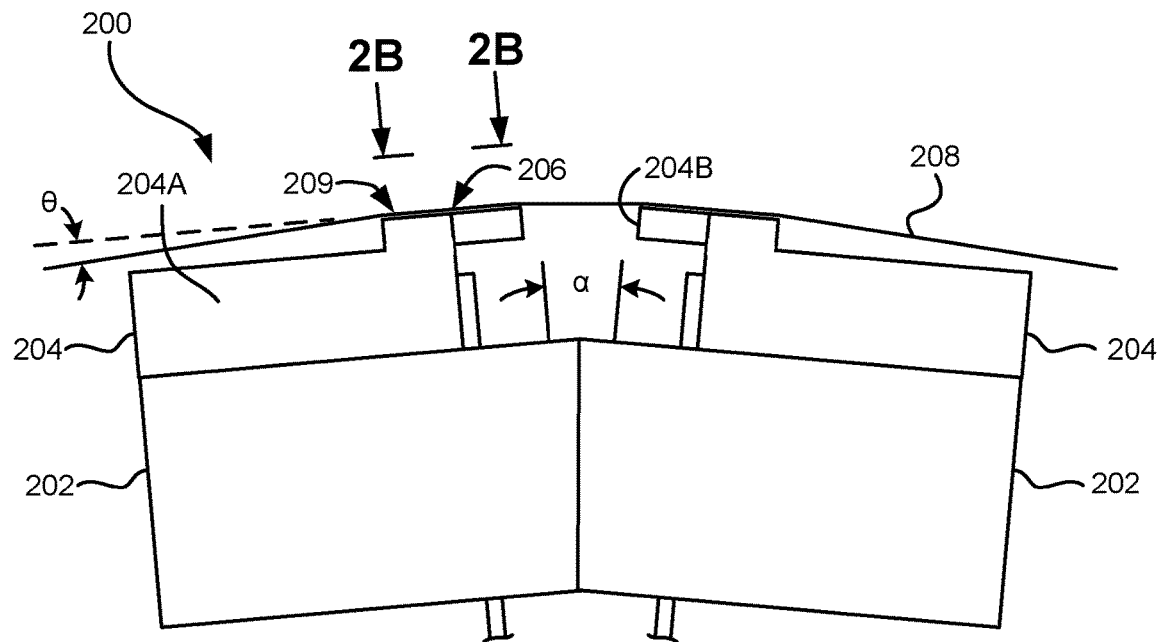
FIG. 2A illustrates a side view of a flat-lapped, bi-directional, two-module magnetic tape head, in accordance with one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
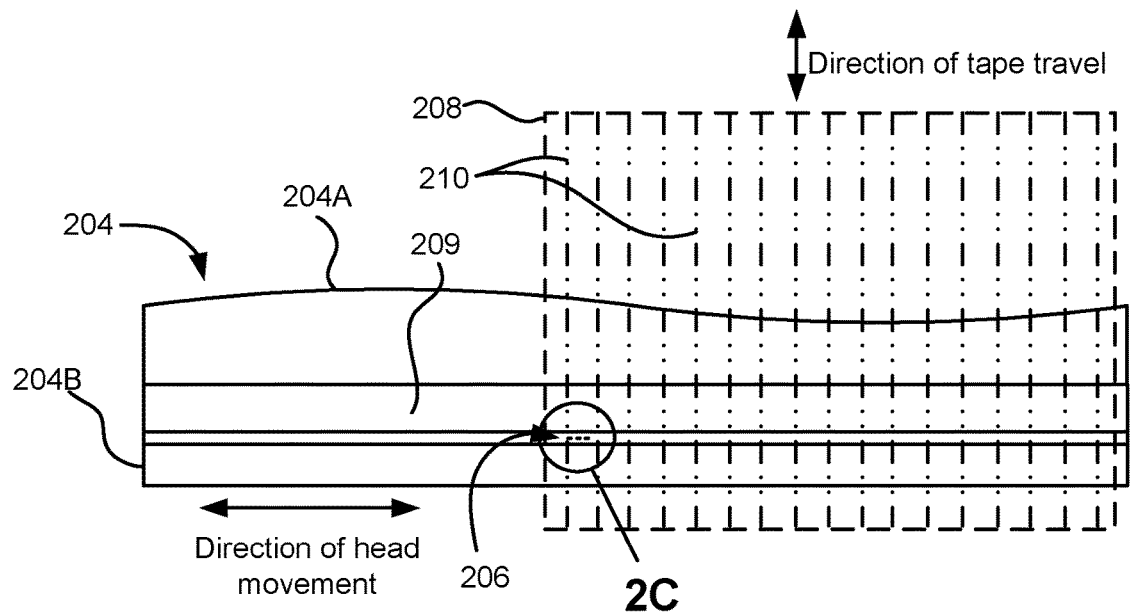
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used for track following, i.e., to keep the readers and/or writers 206 aligned with a particular set of tracks during the read/write operations.

Figure 2C:
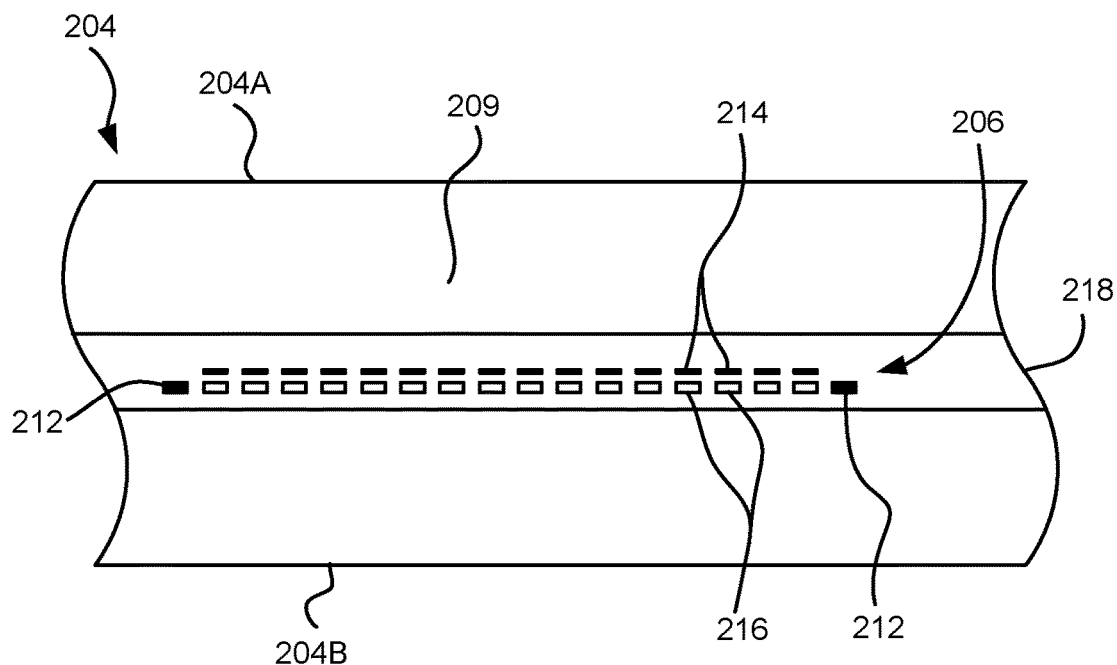
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
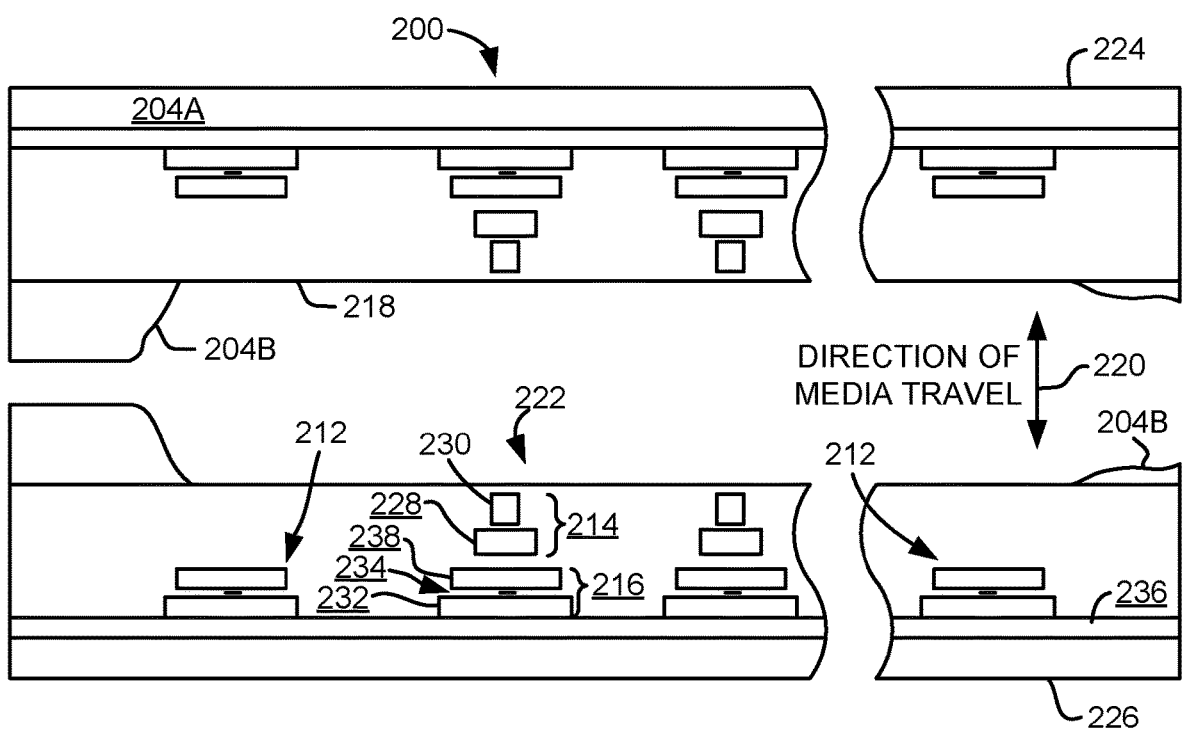
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
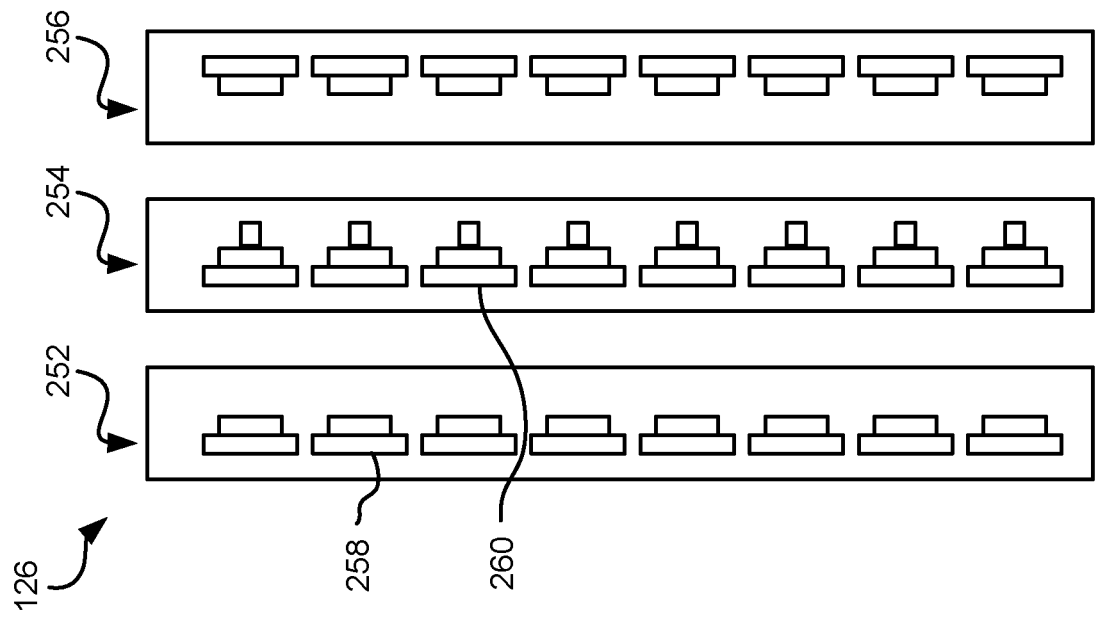
FIG. 4 is a partial tape bearing surface view of a magnetic head having a read-write-read configuration.
Figure 3:
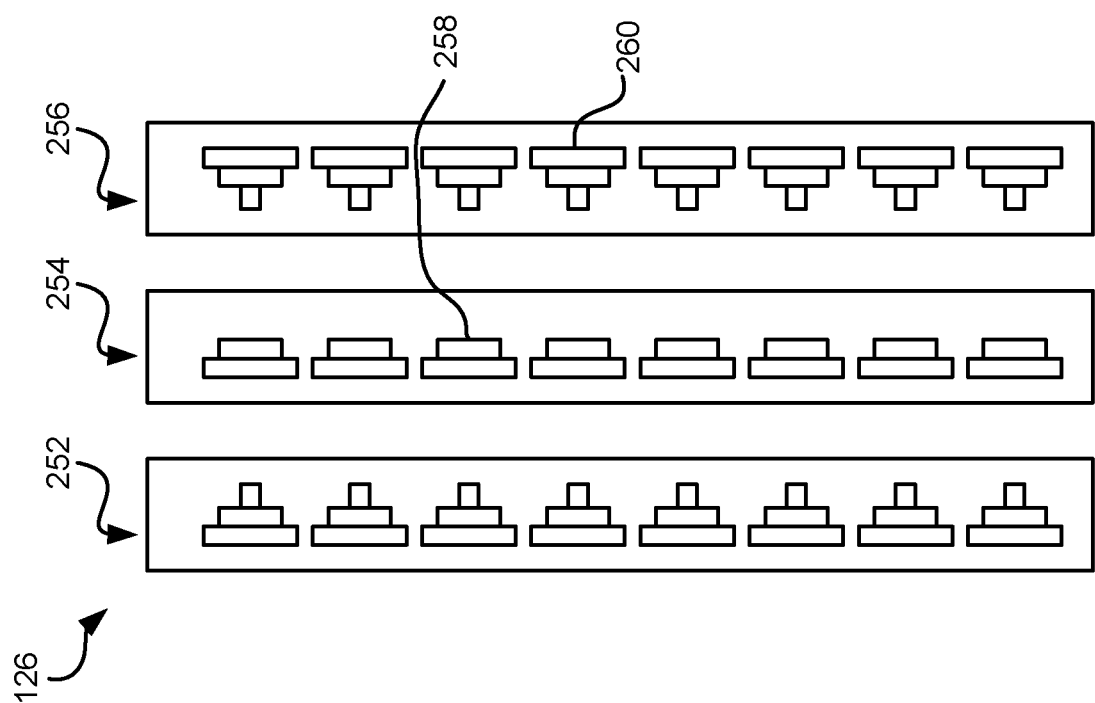
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
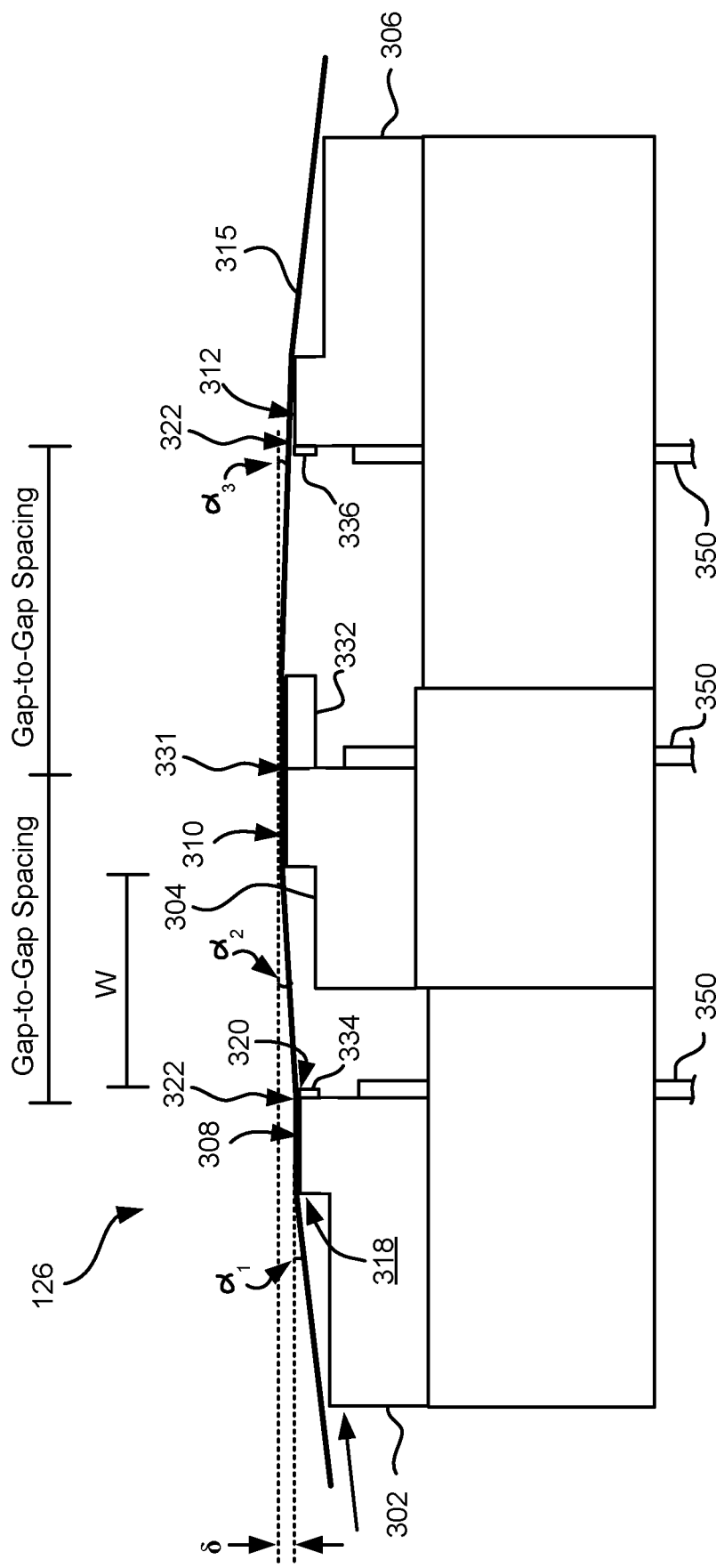
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
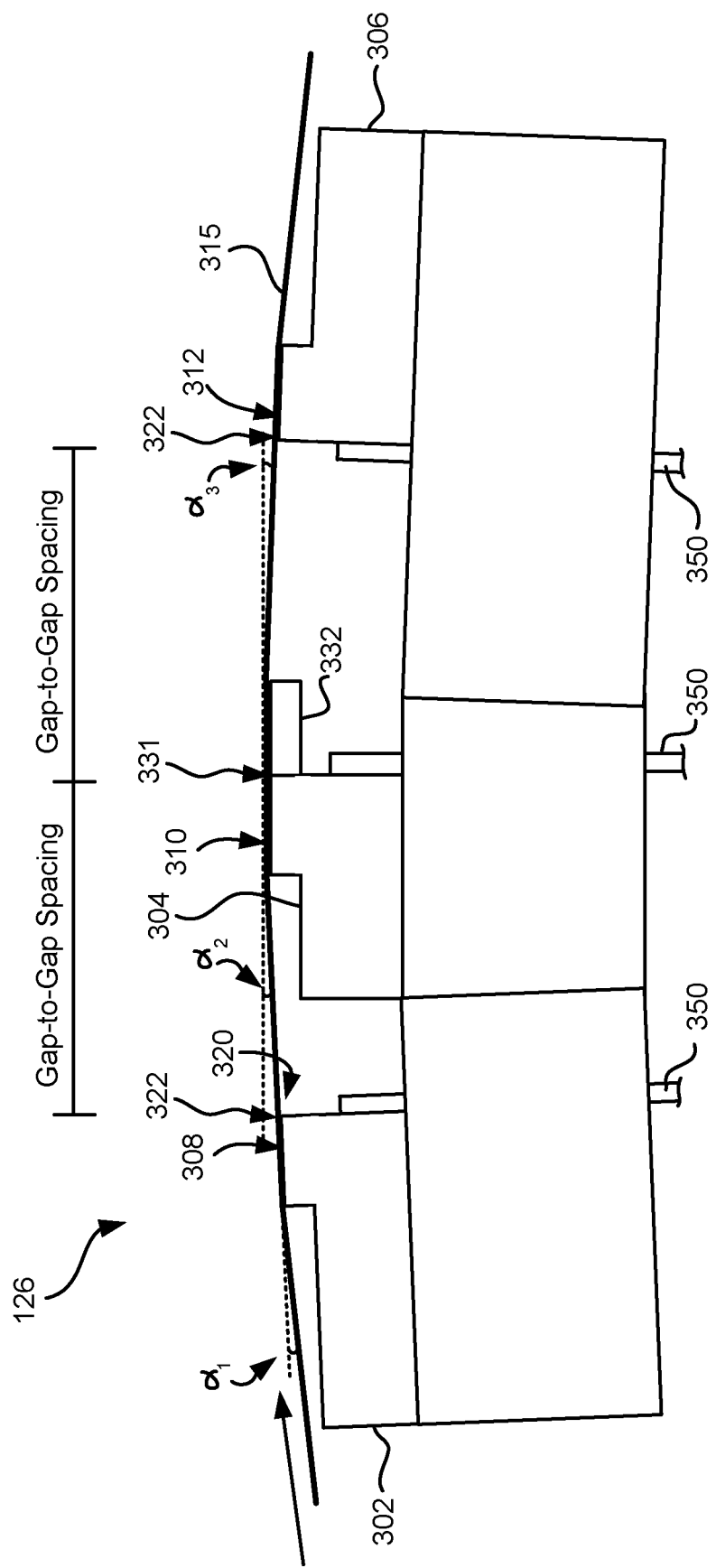
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some aspects, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
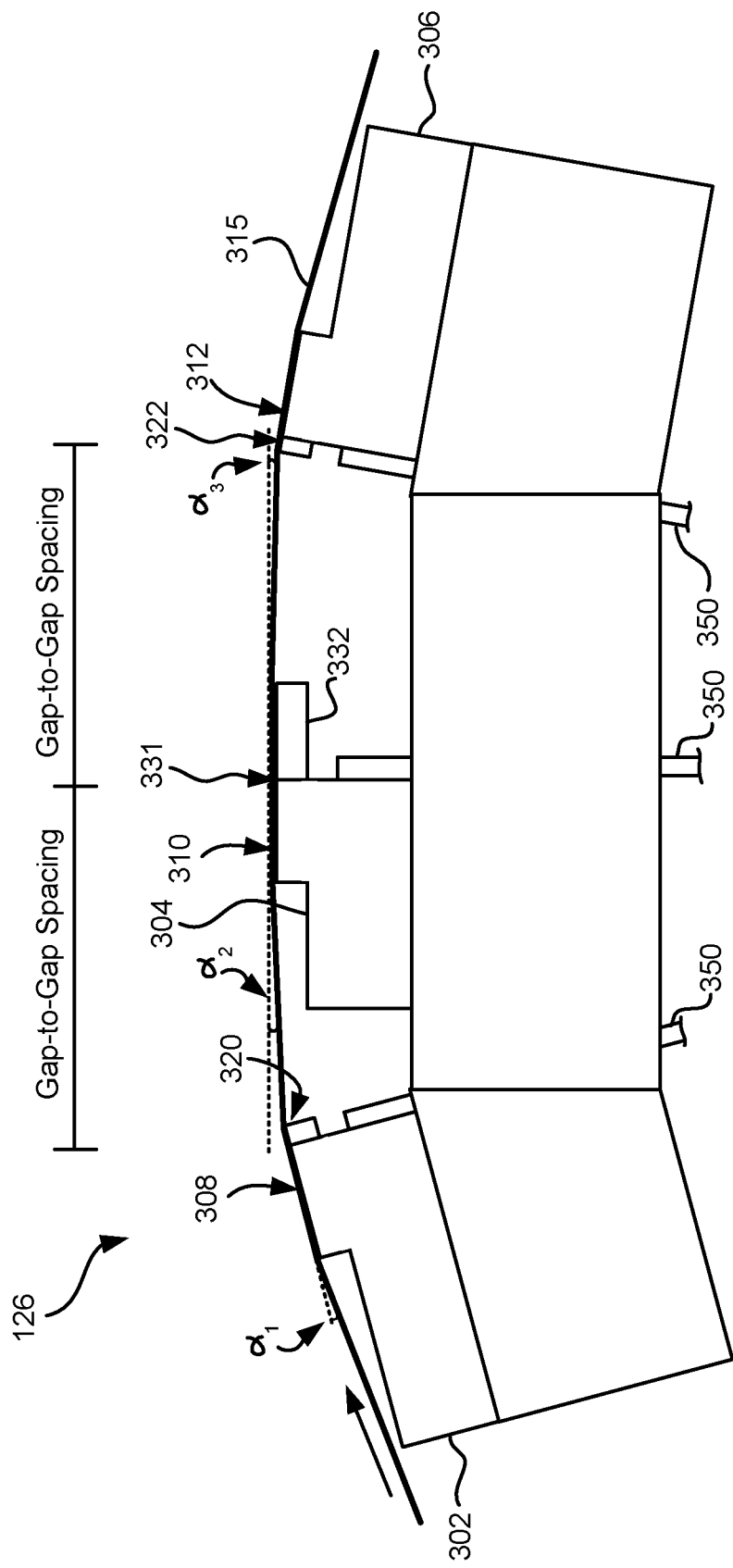
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
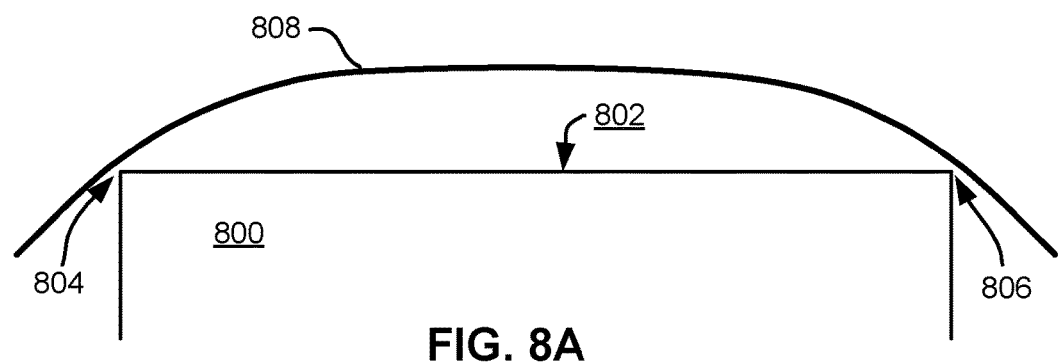
FIGS. 8A-8C are schematics depicting the principles of tape tenting.
Figure 8B:
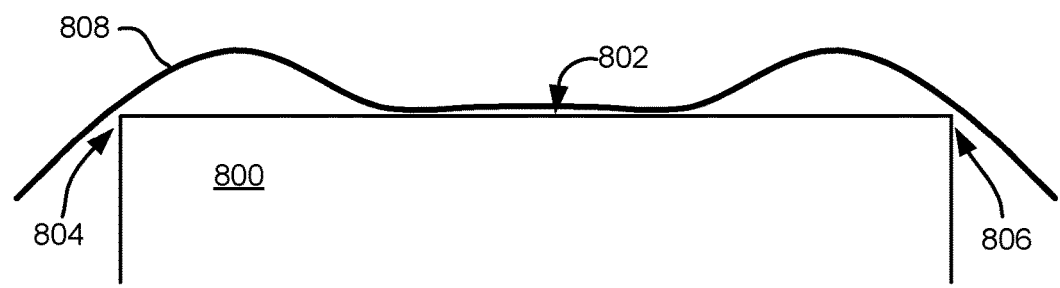
Figure 8C:
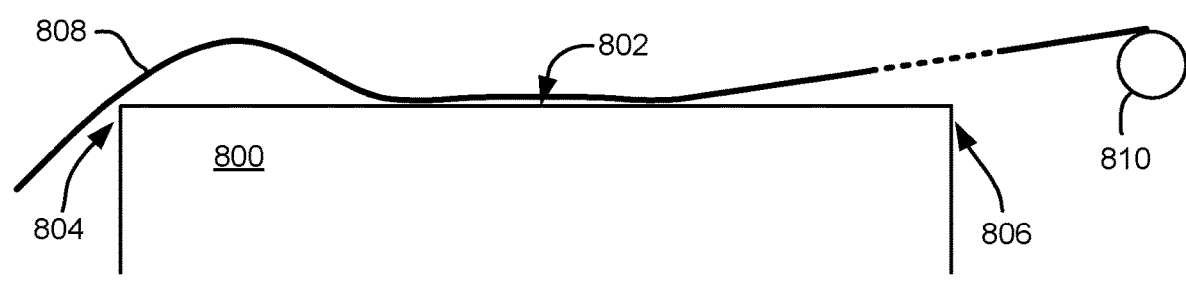

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various approaches herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
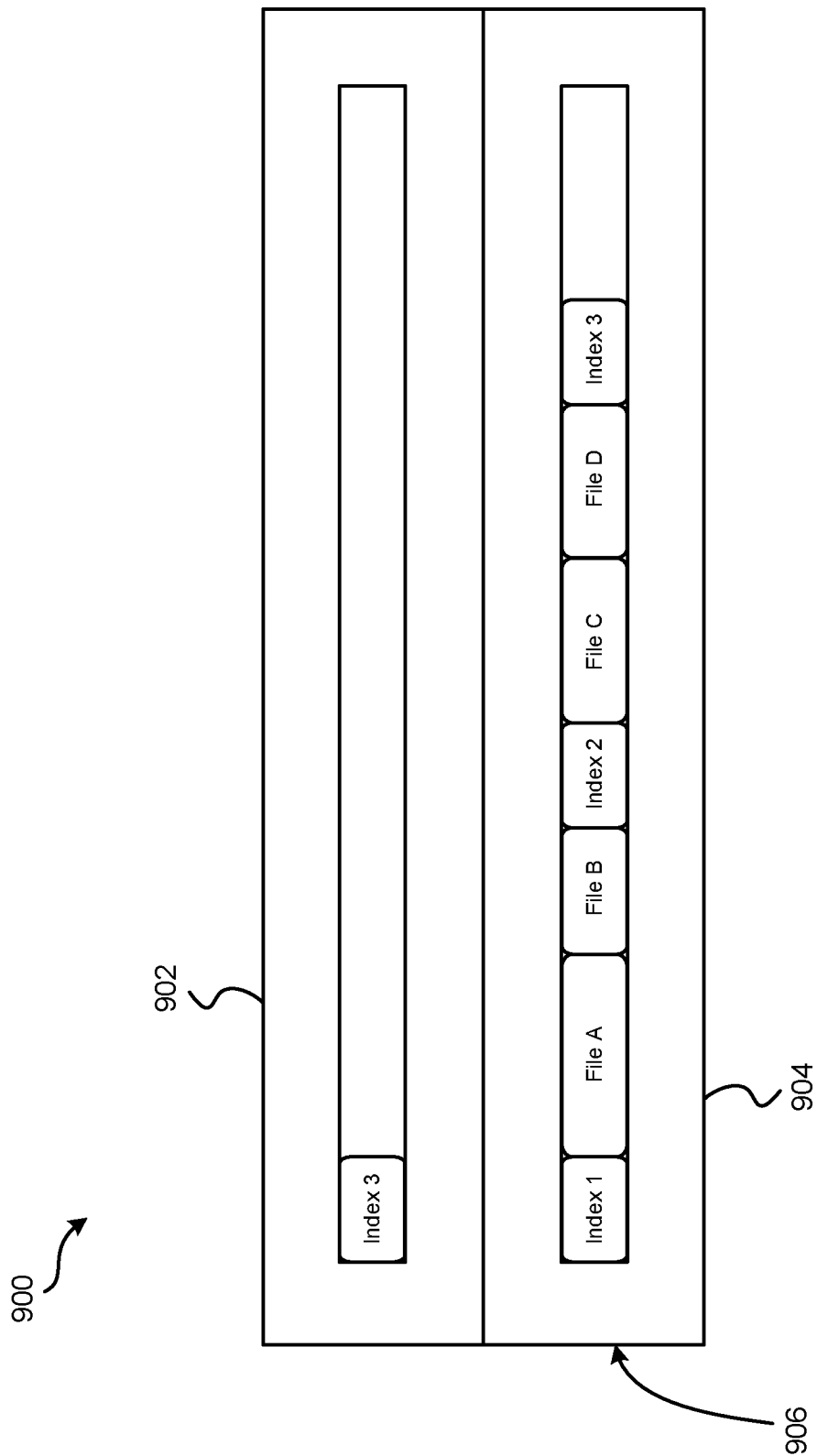
FIG. 9 is a representational diagram of files and indexes stored on a magnetic tape, in accordance with one approach.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As mentioned above, difficulties are encountered when attempting to increase the number of concurrent channels in heads to enable increase in data rate per unit of tape speed, such as increase in crosstalk between writers when more writers are added to a given array width, increase in writer coil resistance, difficulty in managing greater congestion in the wiring layers, higher operating temperature, etc. Various apparatuses and methods presented herein address difficulties encountered when attempting to increase the number of concurrent channels in heads to enable increase in data rate per unit of tape speed.

Various approaches described below include a new head design that is capable of reading and/or writing to magnetic media such as magnetic recording tape in multiple formats. For example, the head can write and/or read data in both legacy and advanced formats, and in doing so can enable full backward compatibility with legacy media types. This is an important criterion for users wishing to move to a new format yet having data stored on media in an older format.

The following description also presents solutions to the problem of designing and making a magnetic tape head which increases the data rate per unit tape speed, and that is backward compatible with prior tape formats. Various approaches also advantageously allow such head to be built from two or more face-to-face modules, two or more of which are generally identical, and have a minimal set of transducers.

Various approaches are associated with a format for magnetic tape recording products and systems whereby data is read from and/or written to two data bands simultaneously. Such format addresses the need for a configuration that enables higher data rate by allowing more active transducer channels in use per wrap, but at the same time provides backward compatibility to at least a previous (legacy) generation having fewer active transducer channels in use per wrap.

Consider, for example, Linear Tape Open, $8^{th}$ generation (LTO-8), which is a 32 channel format that is backward compatible to LTO-5, which is a 16 channel format. LTO was created at the outset to accommodate both 8 and 16 channel formats, and has since moved to 32 channel formats, and thus enables a transition from 16 to 32 channels. Continuing with this example, transitioning from LTO-8 to a format using 64 channels and keeping backward compatibility means at least 32 of the transducers must align with the track layout specified by LTO-8. To transition to 64 transducers and stay within a single data band, the pitch between channels would need to be halved. Again, this creates a plethora of problems.

In some approaches described herein, multi-faceted compatibility is achieved by preserving the legacy transducer layout that includes readers and/or writers as well as servo readers positioned according to a legacy format, such as a format wherein data tracks in a single data band on tape are concurrently operated on. Additional transducers flank the legacy layout and servo readers to enable writing to two or more data bands simultaneously. When the apparatus is used with the legacy format, the readers and/or writers arranged according to the legacy format are used along with the servo readers adjacent thereto, but not the readers and/or writers flanking the inner array. When operating according to newer formats, the readers and/or writers in the legacy transducer layout as well as the readers and/or writers flanking the transducers in the legacy layout are used in some aspects. For example, most or all of the transducers may align with two data bands on the tape, thereby enabling reading and/or writing to data tracks in two data bands simultaneously. This effectively doubles the data rate, and avoids the aforementioned problems encountered when trying to compact twice the number of transducers into a single data band width.

FIGS. 10-16 depict an apparatus 1000, in accordance with various approaches of the present invention. As an option, the present apparatus 1000 may be implemented in conjunction with features from any other approach listed herein, such as those described with reference to the other FIGS. Of course, however, the apparatus 1000 and others presented herein may be used in various applications and/or in permutations which may or may not be specifically described in the illustrative approaches listed herein. Further, the apparatus 1000 presented herein may be used in any desired environment.

Except as otherwise described herein the apparatus 1000 may be constructed via conventional techniques modified to create the new and novel structures described herein. Moreover, except as otherwise described herein the apparatus 1000 may operate using conventional techniques modified as described herein, and/or as would become apparent to one skilled in the art upon reading the present disclosure.

Figure 10:
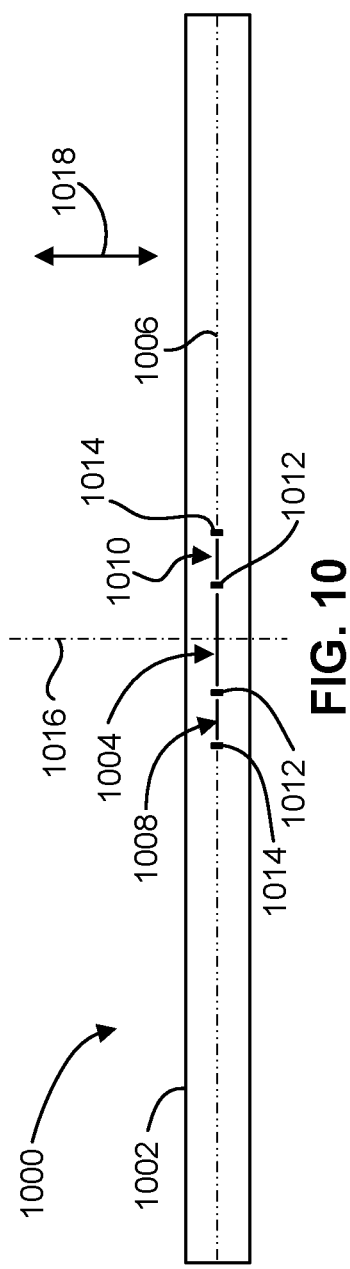
FIG. 10 is a side view of an apparatus according to one approach.

As shown in FIG. 10, the apparatus 1000 includes a module 1002 having an inner array 1004 of data transducers on the module 1002, the transducers of the inner array 1004 being aligned along a common axis 1006 that extends between distal ends of the module 1002. Two outer arrays 1008, 1010 of data transducers are positioned to sandwich the inner array 1004 therebetween.

Preferably, the arrays 1004, 1008, 1010 are positioned in the same thin film gap of the module, which advantageously allows simultaneous fabrication of the transducers. The arrays 1004, 1008, 1010 are preferably aligned along the common axis 1006.

The data transducers in the arrays 1004, 1008, 1010 may be of any type. The data transducers in all arrays are preferably of the same type, e.g., all readers, all writers, piggybacked or merged reader/writer pairs, etc. Known data transducer designs may be used in various aspects.

Moreover, any number of transducers may be present in each array, e.g., 8, 9, 15, 16, 17, 32, 33, 64, 65, 128, 129, etc. Typically, the number of transducers in each outer array 1008, 1010 is about half the number of like transducers in the inner array 1004.

In one aspect, the collective number of transducers in both outer arrays 1008, 1010 equals the total number of transducers in the inner array 1004. In another aspect, the collective number of transducers in the outer arrays 1008, 1010 is less than the total number of transducers in the inner array 1004. For example, the inner array 1004 may have 33 transducers, while each outer array 1008, 1010 has 16 transducers.

Inner servo readers 1012 are positioned between the inner array 1004 and the outer arrays 1008, 1010. Outer servo readers 1014 are positioned toward outer ends of the outer arrays 1008, 1010. The distance between the inner servo readers 1012 corresponds to one data band width of a magnetic recording tape for which the apparatus is designed, e.g., an LTO-compatible tape. Accordingly, the inner servo readers 1012 align to a unique data band on the magnetic recording tape when the inner array 1004 is being used to transduce data on a single data band.

The outer servo readers 1014 are spaced two data bands apart, i.e., a distance between the outer servo readers 1014 corresponds to two data band widths of the magnetic recording tape for which the apparatus is designed.

In further approaches, multiple servo readers may be positioned together at any of the servo reader locations disclosed herein. For example, two or more servo readers may be present adjacent an array to enable use with various types of servo patterns, which may be of any known and/or future type. In one aspect, one of the servo readers in the group of servo readers may be a servo reader positioned in a legacy position, which corresponds to expected servo track centerlines on the tape. In another aspect, two servo readers in the group are centered about the legacy position.

As depicted in FIG. 10, the inner array 1004 is positioned along a centerline 1016 of the module, the centerline being positioned at about a center of the common axis 1006 and oriented along a tape travel direction 1018 relative to the module 1002. However, in other approaches, the midpoint of the inner array 1004 may be offset from the centerline 1016 of the module 1002. Any desired offset may be used in various approaches.

Figure 11:
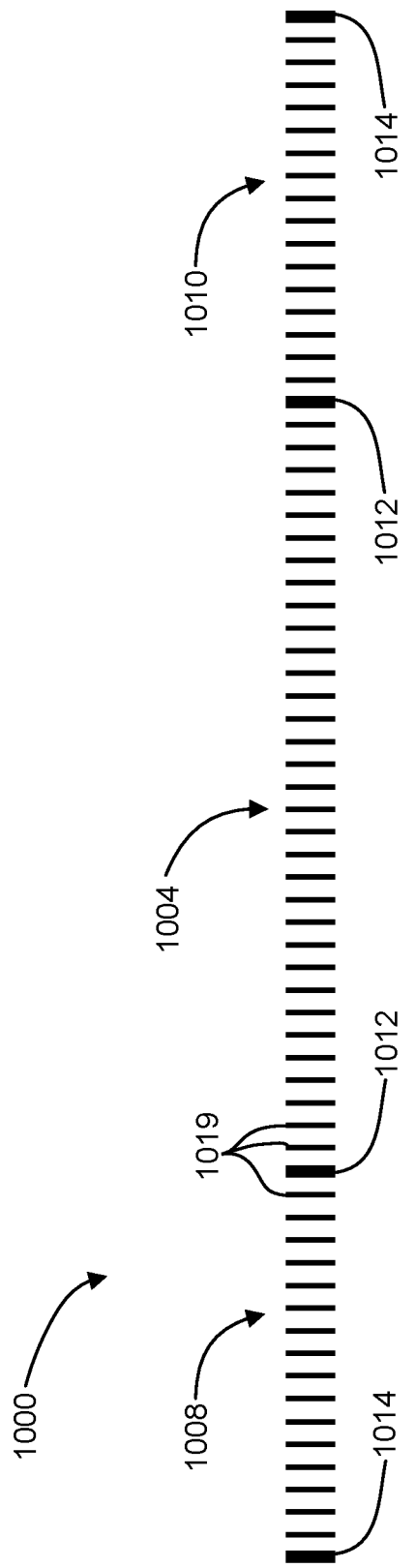
FIG. 11 is a representational view of the arrays of the apparatus, in accordance with one approach.

FIG. 11 depicts one configuration of the arrays 1004, 1008, 1010 of the apparatus 1000. The pitch between data transducers 1019 in each array 1004, 1008, 1010 is about the same. However, in other approaches (not shown), the pitch between the transducers in the outer arrays 1008, 1010 is different than the pitch between the transducers in the inner array 1004.

Figure 12:
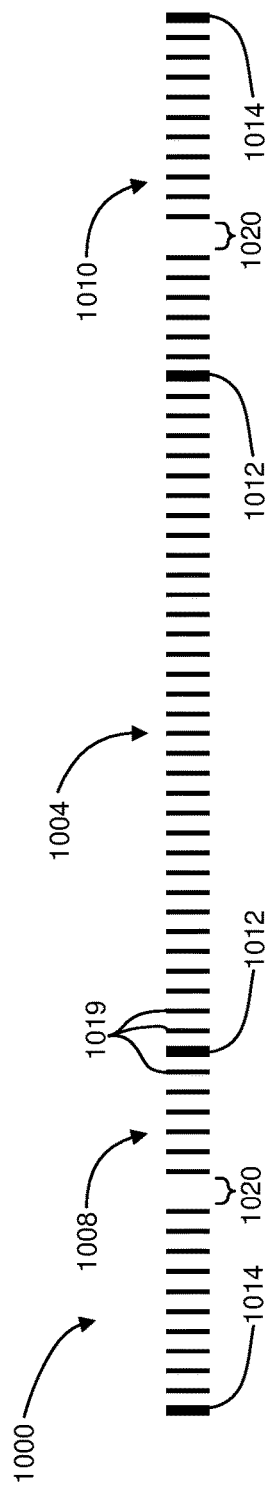
FIG. 12 is a representational view of the arrays of the apparatus, in accordance with another approach.

FIG. 12 depicts another configuration of the apparatus 1000. As shown, a pitch between the data transducers 1019 in the inner array 1004 is about the same as a pitch between only some of the data transducers 1019 in each outer array 1008, 1010. For example, each of the outer arrays 1008, 1010 has a debris median zone 1020 therein defined between adjacent transducers having a greater pitch than any other adjacent pair of transducers in the respective array 1008, 1010. The function of the debris median zone 1020 is to prevent tape edges from rubbing against transducers in the outer arrays when the apparatus is used in the legacy mode.

Preferably, each debris median zone 1020 is at least 1.5 times the pitch between adjacent pairs of transducers in the respective array (excluding the pitch between the two transducers immediately flanking the debris median zone). For example, each debris median zone 1020 may be about 2 times the pitch between adjacent pairs of transducers in the respective array (excluding the pitch between the two transducers immediately flanking the debris median zone). In a yet further approach, each debris median zone 1020 is greater than 2 times the pitch between adjacent pairs of transducers in the respective array (excluding the pitch between the two transducers immediately flanking the debris median zone). Note also that the number of transducers in each outer array 1008, 1010 may be reduced to accommodate the debris median zone 1020 while maintaining the position of the outer servo readers 1014 to remain over the servo tracks on tape.

Figure 13:
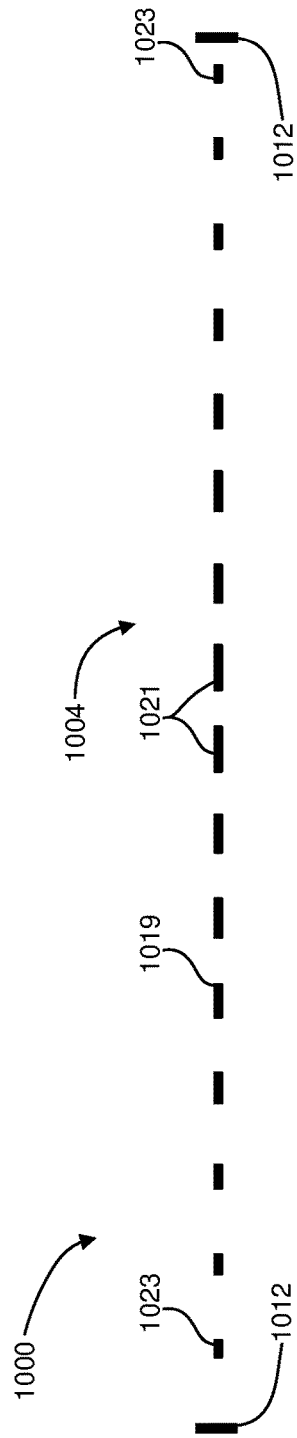
FIG. 13 is a representational view of an inner array of the apparatus, in accordance with one approach.

In some approaches, widths of at least some of the outermost data transducers, e.g., readers, in the inner array 1004 are less than widths of at least some of the innermost data transducers in the inner array 1004. Reference is made by way of example to FIG. 13, which depicts inner array 1004 having transducer widths that progressively decrease from the innermost data transducers to the outermost data transducers.

In operation, with or without both outer arrays functioning, the inner servo readers 1012 read servo tracks on the tape. A controller analyzes the servo readback signal and positions the array 1004 at the appropriate position relative to the tape so that the data transducers 1019 are over the appropriate data tracks on the tape. Thus, for example, if the tape expands and the innermost readers are centered as closely as possible to the centers of the respective data tracks they are intended to read, the outermost readers of inner array 1004 will be adjacent the inside edges of the data tracks they are intended to read. Conversely, if the tape contracts and the innermost readers are centered as closely as possible to the centers of the respective data tracks, the outermost readers of inner array 1004 will be adjacent the outer edges of the data tracks they are intended to read. The servo controller may be programmed to determine how to center the readers of the inner array on the data tracks.

In one approach, the track width of the innermost readers 1021 may be set at close to the track pitch on the tape, e.g., 0.6 to 1 times the track pitch. The track widths of the remaining readers progressively decrease from the innermost reader 1021 to the outermost reader 1023.

In another approach, the track width of the innermost readers 1021 may be set at what it would be in a conventionally designed head, e.g., about 0.25 to about 0.6 times the track pitch on the tape. The track widths of the remaining readers progressively decrease from the innermost reader 1021 to the outermost reader 1023. The pitch (center to center spacing) between the readers is preferably uniform across the reader array. In another approach, the track width of the innermost readers 1021 may be set at what it would be in a conventionally designed head, e.g., about 0.25 to about 0.6 times the track pitch on the tape, with track widths of the remaining readers progressively decrease from the innermost reader 1021 to the outermost reader 1023. An illustrative track width of the outermost reader 1023 is in a range of 0.5 to 1 micron, e.g., 0.7 micron, while an illustrative track width of the innermost reader 1021 is in a range of 0.75 to 1.3 micron, e.g., 1.2 micron. Of course, this range could be larger or smaller, with endpoints being higher or lower in various aspects.

The progressively narrowing width of the readers reduces misregistration due to mis-tracking and tape width changes. A wider reader provides a lower noise signal. Particularly, making track widths of the innermost readers wider can boost signal-to-media noise ratio (SMNR) by an amount proportional to the square root of the reader width for the central tracks in products where the written track pitch approaches 2-3 microns. A preferred approach has reader track widths scaled linearly from widest at the innermost reader 1021 to narrowest at the outmost reader 1023.

An alternate approach has reader track widths scaled non-linearly from widest at the innermost reader 1021 to narrowest at the outmost readers 1023. In one aspect, the reader track widths decrease progressively more pronouncedly from the innermost reader 1021 to the outmost reader 1023.

Figure 14:
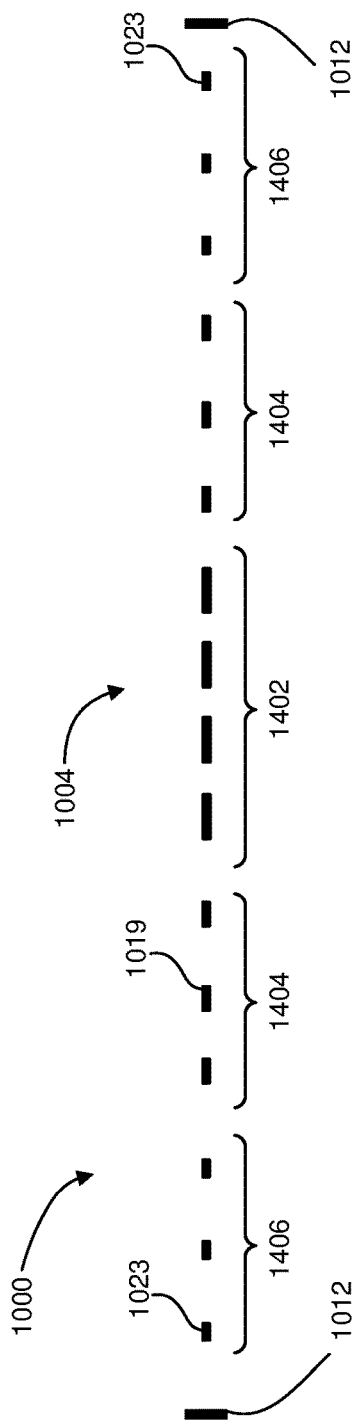
FIG. 14 is a representational view of an inner array of the apparatus, in accordance with one approach.

In another approach, shown in FIG. 14, adjacent sets 1402, 1404, 1406 of multiple readers have reader track widths that are about the same in a given set. The track widths decrease from the innermost set 1402 to the outermost sets 1406. Such an approach may be selected for processing considerations.

In all approaches, the track widths of the innermost readers are preferably still smaller than the widths of the written data tracks so that tape lateral transients do not create misregistration. Note that some overlap of the readers onto adjacent data tracks is permissible, as in an approach having filtering and/or implementing a deconvolution scheme. Thus, some reader track widths may be as large as, or larger than, the written track widths.

In various aspects, the widths of the transducers in the inner array 1004 are scaled, e.g., as described with reference to FIGS. 13-14, while the widths of the transducers in the outer arrays 1008, 1010 are not scaled but rather have a generally uniform width. In other aspects, the widths of the transducers in the inner array 1004 are not scaled, while the widths of the transducers in the outer arrays 1008, 1010 are scaled. In yet other aspects, the widths of the transducers in the inner array 1004 are scaled, and the widths of the transducers in the outer arrays 1008, 1010 are also scaled.

Accordingly, in some approaches, widths of at least some of the outermost data transducers in each outer array 1008, 1010 are less than widths of at least some of the innermost data transducers in each outer array 1008, 1010. Reference is made by way of example to FIG. 15, which depicts outer array 1008. In operation with both outer arrays functioning, the outer servo readers 1014 read servo tracks on the tape. A controller analyzes the servo readback signal and positions the arrays at the appropriate position relative to the tape so that the data transducers 1019 are over the appropriate data tracks on the tape. If the tape expands, the outermost readers of outer array 1008 may be adjacent the inside edges of the data tracks, yet the readers of the inner array (not shown) are more closely aligned with the center of the data tracks. The servo controller can determine how to center the readers of the inner array on the data tracks. Particularly, outer servo readers 1014 have a very small track width compared to servo tracks, and the controller can determine the lateral position of the arrays relative to the tape based on the servo readback signal.

The readers of the inner array may thus be very close to centrally-aligned with the inner data tracks, as tape lateral expansion and contraction will have an increasingly greater effect on the position of the data tracks relative to the readers/writers of the outer arrays, and more so for outermost readers/writers of the outer arrays. Toward the middle of the arrays, tape lateral expansion should have very little effect on track/reader misregistration. Accordingly, the readers can be made wider towards the middle of the group of arrays, thereby providing an improved signal having greater signal to media noise ratio.

With continued reference to FIG. 15, inner readers of outer array 1008, preferably including at least the innermost reader 1022, have a wider track width than at least some of the outer readers, i.e., those positioned between the inner readers and the ends of the array, and including the outermost readers 1024, which neighbors outer servo readers 1014 in this approach. For example, the track width of the outermost reader 1024 may be set at what it would be in a conventionally designed head, e.g., about 0.25 to about 0.6 times the track pitch on the tape. The track widths of the remaining readers progressively decrease from the innermost reader 1022 to the outermost reader 1024. The pitch (center to center spacing) between the readers 1022 and 1024 is preferably uniform across the reader array. In another approach, the track width of the innermost readers 1022 may be set at what it would be in a conventionally designed head, e.g., about 0.25 to about 0.6 times the track pitch on the tape, with track widths of the remaining readers progressively decrease from the innermost reader 1022 to the outermost reader 1024. An illustrative track width of the innermost reader 1022 is in a range of 0.5 to 1 micron, e.g., 0.7 micron, while an illustrative track width of the outermost reader 1024 is in a range of 0.75 to 1.3 micron, e.g., 1.2 micron. Of course, this range could be larger or smaller, with endpoints being higher or lower in various aspects.

The progressively narrowing width of the readers reduces misregistration due to mis-tracking and tape width changes. A wider reader provides a lower noise signal. Particularly, making track widths of the innermost readers wider can boost signal-to-media noise ratio (SMNR) by an amount proportional to the square root of the reader width for the central tracks in products where the written track pitch approaches 2-3 microns. A preferred approach has reader track widths scaled linearly from widest at the innermost reader 1022 to narrowest at the outmost reader 1024.

An alternate approach has reader track widths scaled non-linearly from widest at the innermost reader 1022 to narrowest at the outmost readers 1024. In one aspect, the reader track widths decrease progressively more pronouncedly from the innermost reader 1022 to the outmost reader 1024.

Yet another approach, shown in FIG. 16, has adjacent sets 1602, 1604, 1606, 1608 of readers with reader track widths being about the same in a given set, where the track widths in a given set decrease from the innermost set 1602 to the outermost sets 1608. Such an approach may be selected for processing considerations.

The track widths of the innermost readers are preferably still smaller than the widths of the written data tracks so that tape lateral transients do not create misregistration. Note that some overlap of the readers onto adjacent data tracks is permissible, as in an approach having filtering and/or implementing a deconvolution scheme. Thus, some reader track widths may be as large as, or larger than, the written track widths.

In one approach, the transducers of the inner array 1004 have uniform widths while the transducers in the outer arrays 1008, 1010 have the varying widths, e.g., as demonstrated in FIGS. 15-16.

In one approach, both the inner and outer arrays 1004, 1008, 1010 have transducers with differing widths, e.g., as depicted in FIGS. 13-16 in any combination. For example, the innermost data transducers of the outer arrays may have a similar width as the outermost data transducers of the inner array. In another approach, the innermost data transducers of the outer arrays may have a smaller width than the outermost data transducers of the inner array.

While various positions of the transducer arrays are shown in FIGS. 10-16, the arrays may be located in other positions relative to the centerline 1016 in various approaches. For example, positions of the arrays may be selected to ensure the tape does not extend beyond the edge of the module when in use.

In some aspects, the apparatus may include logic and/or a mechanism for adjusting the span of the module and/or the span of one or both arrays to accommodate tape and/or head expansion and/or contraction. Illustrative techniques include actively controlling tape tension, the use of heaters and/or coolers to induce expansion/contraction of the module, piezo actuation of the module, tilting the module, etc.

As noted above with reference to FIG. 1A, the apparatus 1000 of FIGS. 10-16 may include a drive mechanism for passing a magnetic medium over the module and a controller electrically coupled to the module.

In one mode of use, the controller is configured to simultaneously transduce data on two data bands of the magnetic recording tape, and perform track following using at least two outer servo readers positioned outside the arrays. For example, when a magnetic recording tape is passed over the module 1002, at least some of the transducers of all arrays 1004, 1008, 1010 are used reading or writing simultaneously. The outer servo readers 1014 are used for track following in one approach. Any type of servo pattern and/or track following technique may be used, including conventional patterns and techniques.

In another mode of use, where all data tracks simultaneously operated on are within a single data band, the inner array is selected for use. The controller is thus configured to select the inner array according to a legacy mode of operation, perform track following using the inner servo readers 1012, and transduce data in a single data band using only the inner array 1004.

In any approach, the outer servo readers 1014 may be used for at least skew following.

Figure 17:
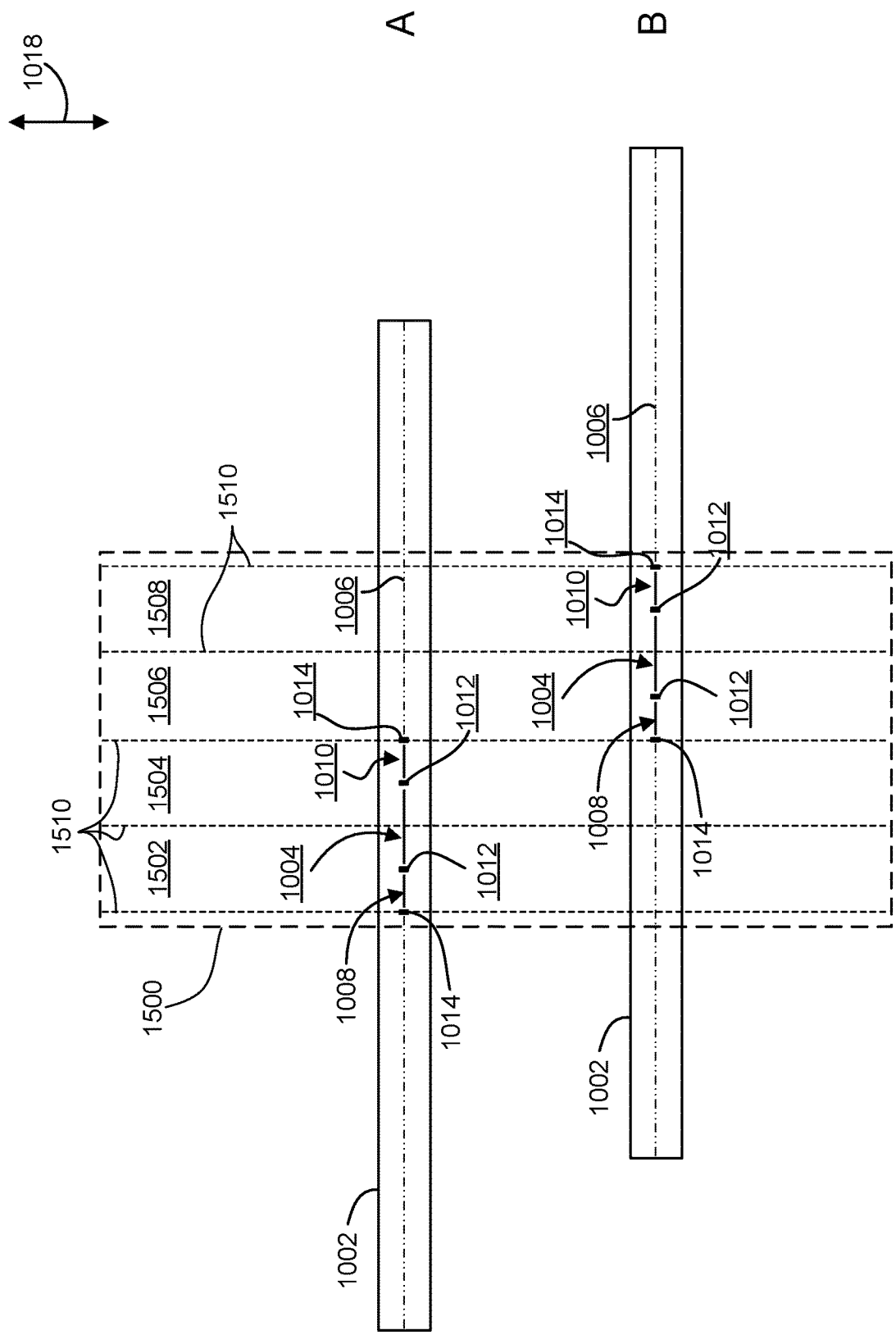
FIG. 17 is a representational view of the apparatus of FIG. 10 in use, in accordance with one approach.

FIG. 17 depicts use of the apparatus 1000 of FIG. 10 for reading a format where all data tracks simultaneously operated on in a given pass are within two adjacent data bands. For example, when the module 1002 is positioned at position A, the two leftmost data bands 1502, 1504 of the magnetic recording tape 1500 are operated on simultaneously using the arrays 1004, 1008, 1010. Any type of reading or writing may be performed such as, for example, serpentine or nonserpentine shingled writing. As shown, the outer servo readers 1014 are each positioned above a respective servo track 1510. Also, the transducer of the inner array 1004 positioned above a servo track is preferably not used.

Once the data operation is completed in data bands 1502, 1504, the module 1002 may be moved to position B to position the arrays 1004, 1008, 1010 above the rightmost data bands 1506, 1508, and the desired operation performed.

Figure 18:
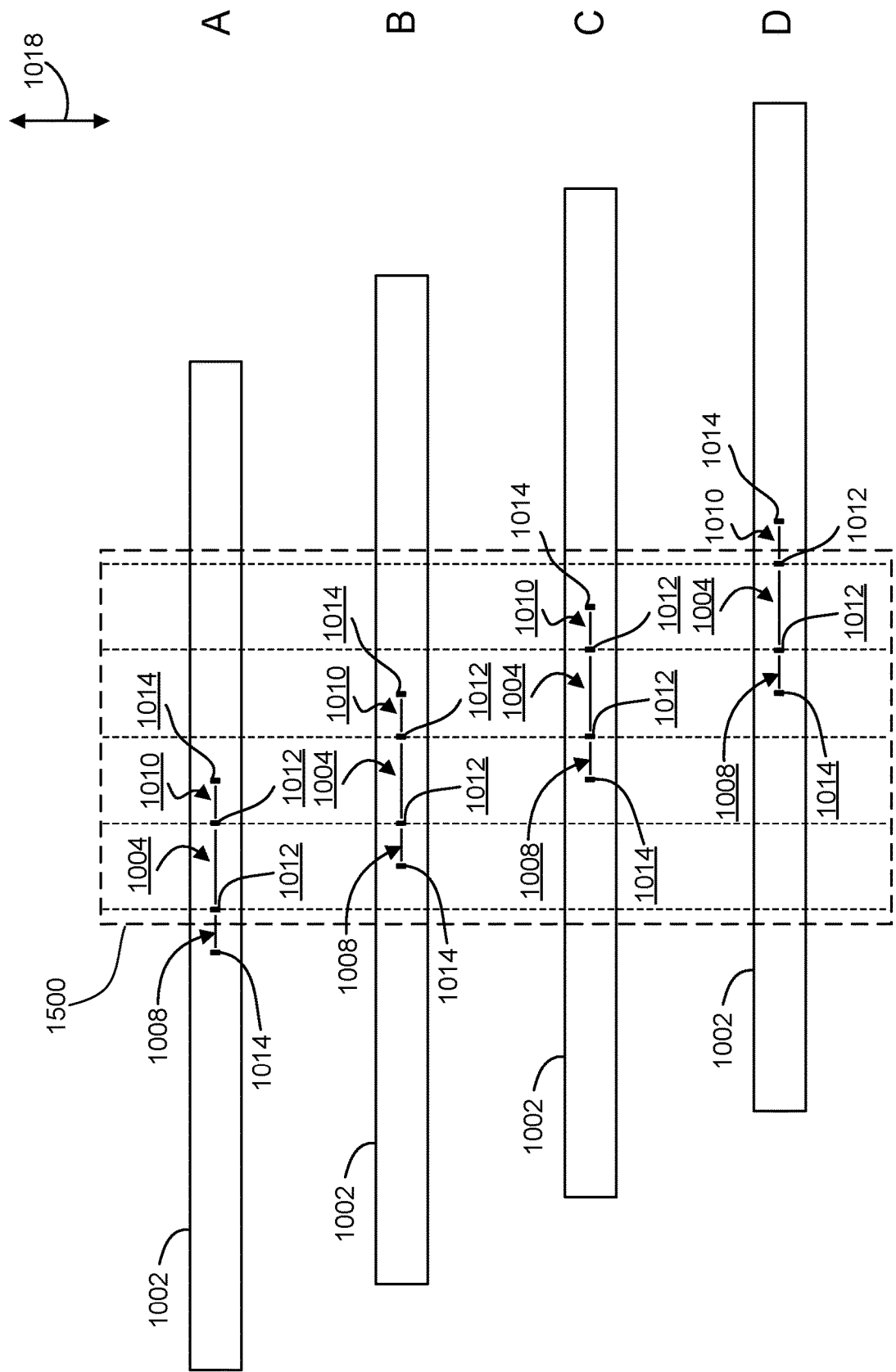
FIG. 18 is a representational view of the apparatus of FIG. 10 in use, in accordance with one approach.

FIG. 18 depicts use of the apparatus 1000 of FIG. 10 for reading a legacy format where all data tracks simultaneously operated on in a given pass are within a single data band of the magnetic recording tape 1500. Operation is similar to that described with reference to FIG. 17, except only the inner array 1004 is used, and the module 1002 is moved to positions A-D to operate on each data band. Track following may be performed using the inner servo readers 1012.

Figure 19:
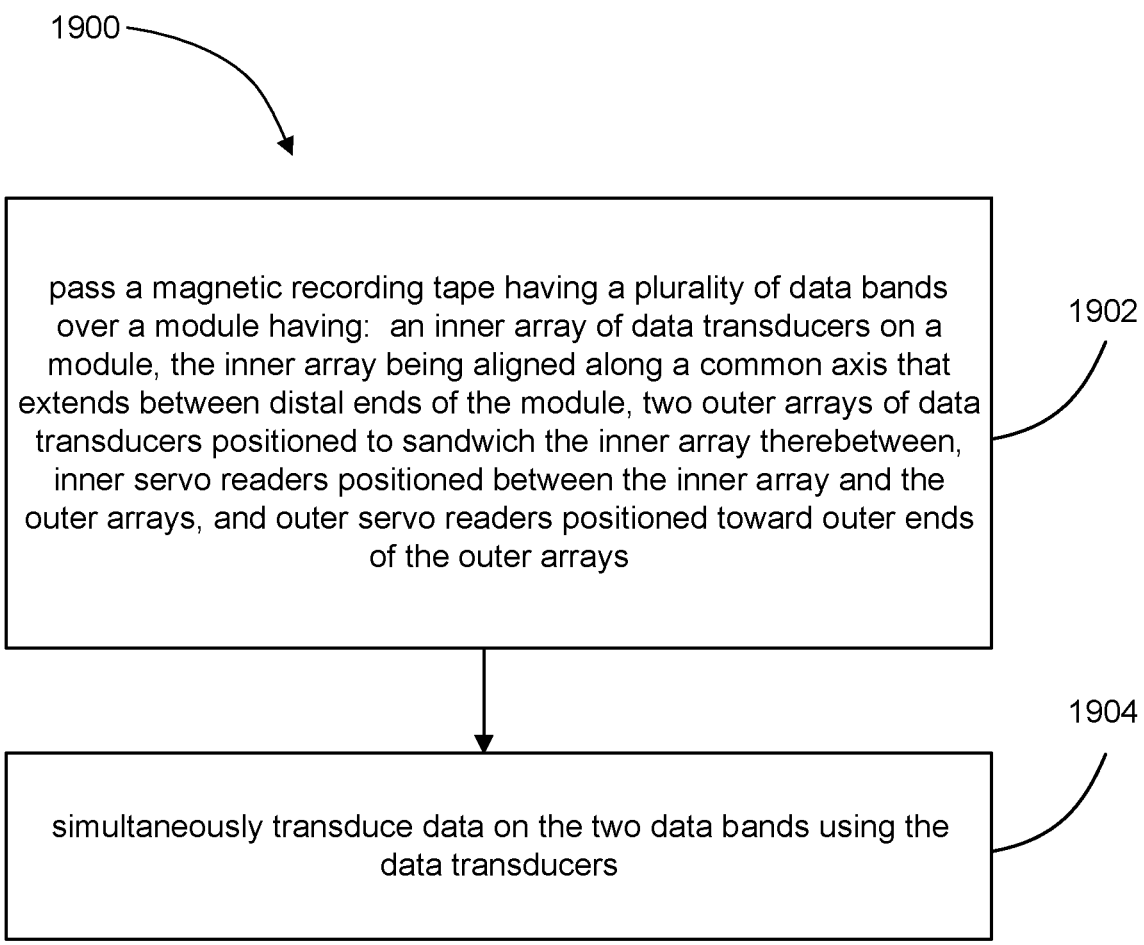
FIG. 19 is a flow diagram of a method, in accordance with one approach.
Figure 20:
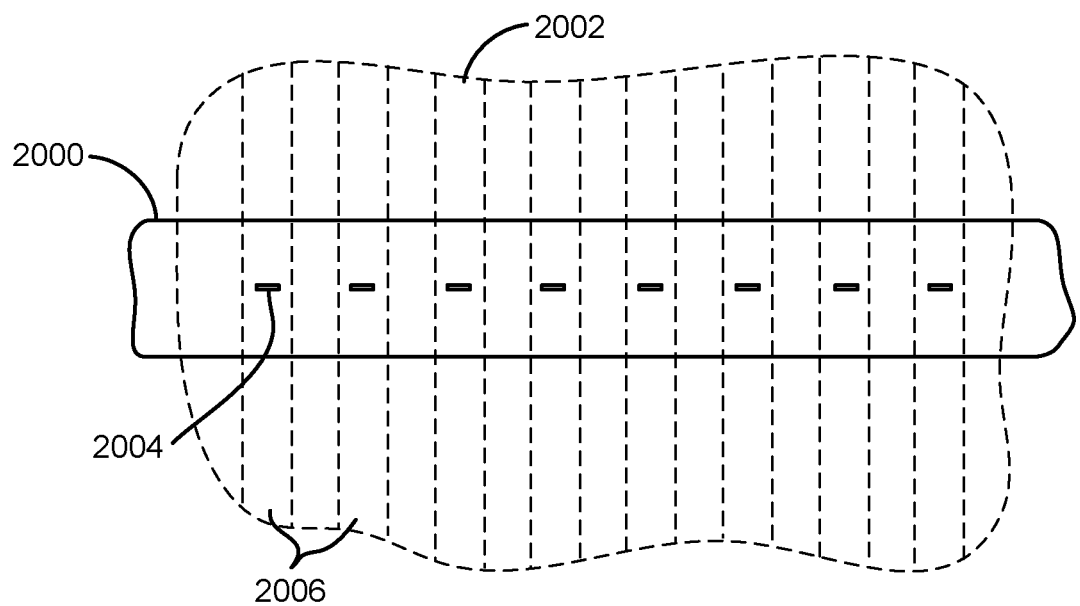
FIGS. 20 and 21A-21B illustrate the effect of tape lateral expansion and contraction.
Figure 21A:
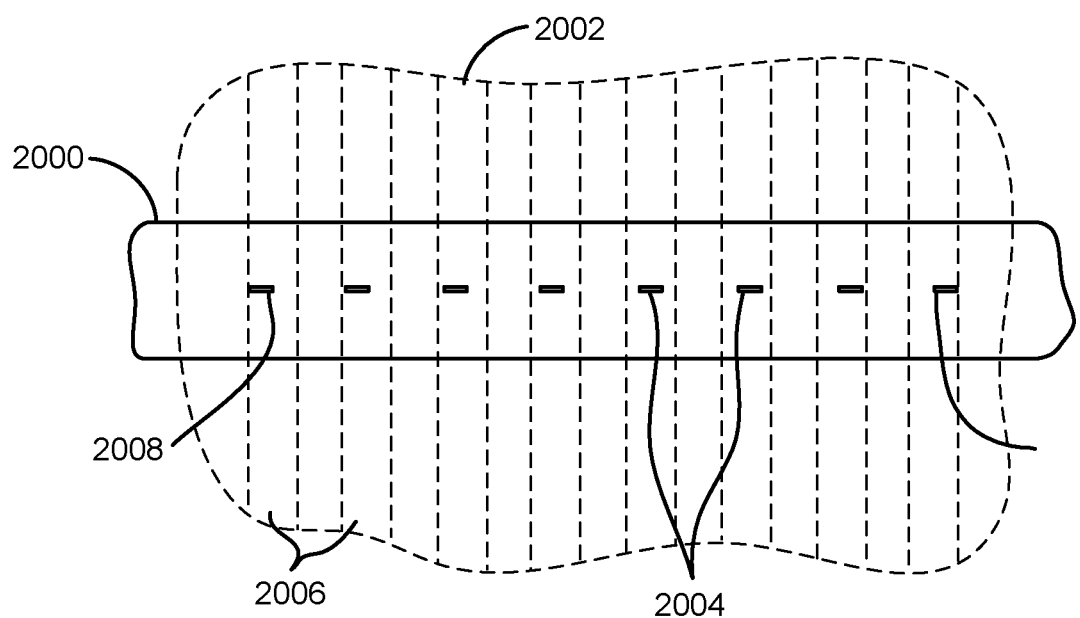
Figure 21B:
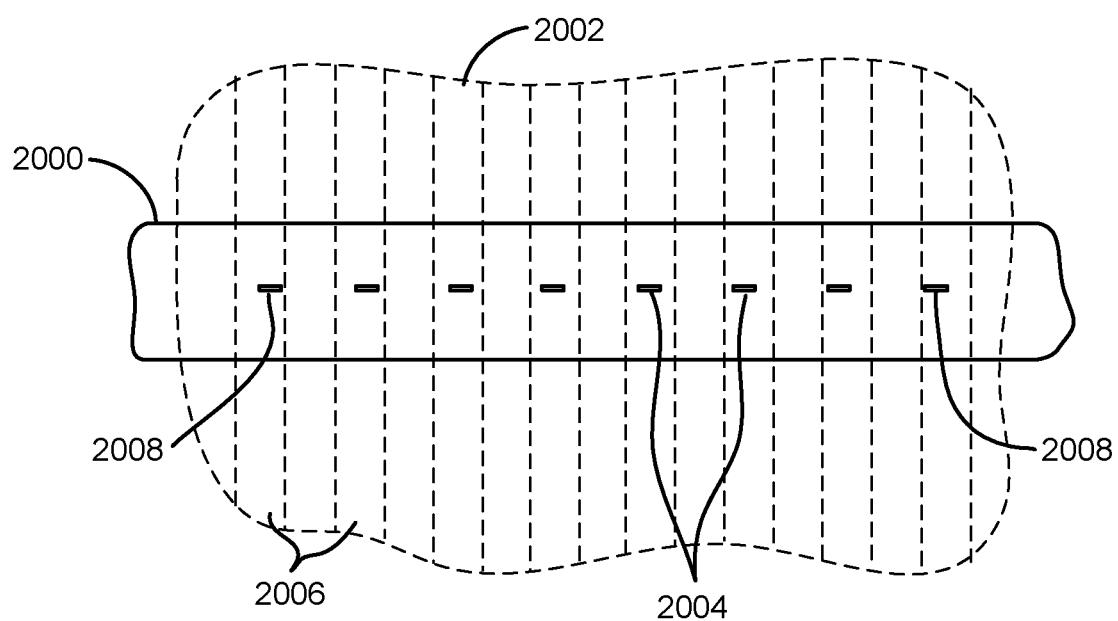

Now referring to FIG. 19, a flowchart of a method 1900 is shown according to one approach. The method 1900 may be performed in accordance with the present invention in any of the environments depicted in FIGS. 1-18, among others, in various approaches. Of course, more or less operations than those specifically described in FIG. 19 may be included in method 1900, as would be understood by one of skill in the art upon reading the present descriptions.

Each of the steps of the method 1900 may be performed by any suitable component of the operating environment. For example, in various approaches, the method 1900 may be partially or entirely performed by a tape drive or some other device having one or more processors therein. The processor, e.g., processing circuit(s), chip(s), and/or module(s) implemented in hardware and/or software, and preferably having at least one hardware component may be utilized in any device to perform one or more steps of the method 1900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 19, method 1900 may initiate with operation 1902, where a magnetic recording tape having a plurality of data bands is passed over a module according to any approach described herein. Preferred approaches use a version of the module depicted in FIGS. 10-18. Operation 1904 includes simultaneously transducing data on two of the data bands using the data transducers of the arrays, i.e., reading and/or writing. Track following may be performed using at least the two outer servo readers.

In one aspect, the inner array may be selected according to a legacy mode of operation. Track following is performed using the inner servo readers adjacent the inner array. Data is transduced using only the inner array. See, e.g., FIG. 18.

Various additional operations may be performed, according to various aspects. For example, tape tension may be adjusted, e.g., tension may be used to adjust the width of the tape to help maintain registration between the transducers and the data tracks on tape. The effects of tensioning scale uniformly across the tape, making this approach very useful.

In another approach, the tilt of the arrays relative to longitudinal axes of the data bands may be adjusted to alter the pitch of the transducers as presented to the tape.

Known tape drive operations of any type may also be performed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The descriptions of the various embodiments and aspects of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   an inner array of data transducers on a module, the data transducers of the inner array being aligned along a common axis that extends between distal ends of the module;
   two outer arrays of data transducers positioned to sandwich the inner array therebetween;
   inner servo readers positioned between the inner array and the outer arrays; and
   outer servo readers positioned toward outer ends of the outer arrays,
   wherein widths of at least some of the outermost data transducers in the inner array are less than widths of at least some of the innermost data transducers in the inner array,
   wherein a pitch between data transducers in the inner array is about the same as a pitch between at least some of the data transducers in each outer array.

2. An apparatus as recited in claim 1, wherein the pitch between data transducers in the inner array is about the same as the pitch between data transducers in each outer array.

3. An apparatus as recited in claim 1, wherein the pitch between data transducers in the inner array is about the same as the pitch between only some of the data transducers in each outer array.

4. An apparatus as recited in claim 1, wherein a distance between the inner servo readers corresponds to one data band width of a magnetic recording tape for which the apparatus is designed.

5. An apparatus as recited in claim 4, wherein a distance between the outer servo readers corresponds to two data band widths of the magnetic recording tape for which the apparatus is designed.

6. An apparatus as recited in claim 1, wherein the inner array is centered on the module between distal ends of the module.

7. An apparatus as recited in claim 1, wherein the collective number of transducers in both outer arrays equals the total number of transducers in the inner array.

8. An apparatus as recited in claim 1, wherein the collective number of transducers in the outer arrays is less than the total number of transducers in the inner array.

9. An apparatus as recited in claim 1, wherein each of the outer arrays has a debris median zone therein defined between adjacent transducers having a greater pitch than any other adjacent pair of transducers in the respective array.

10. An apparatus as recited in claim 9, wherein each debris median zone is at least 1.5 times the pitch between adjacent pairs of transducers in the respective array.

11. An apparatus as recited in claim 9, wherein each debris median zone is about 2 times the pitch between adjacent pairs of transducers in the respective array.

12. An apparatus as recited in claim 9, wherein each debris median zone is greater than 2 times the pitch between adjacent pairs of transducers in the respective array.

13. An apparatus as recited in claim 1, wherein widths of at least some of the outermost data transducers in each outer array are less than widths of at least some of the innermost data transducers in each outer array.

14. An apparatus as recited in claim 1, wherein a width of each transducer in each outer array is about the same.

15. An apparatus as recited in claim 1, wherein the transducer widths progressively decrease from the innermost data transducers to the outermost data transducers.

16. An apparatus as recited in claim 1, wherein the data transducers are grouped into sets of greater than one transducer, the transducers in each set having widths that are about the same in that set, wherein the widths decrease from the innermost set to the outermost sets.

17. An apparatus as recited in claim 1, further comprising:
   a drive mechanism for passing a magnetic medium over the module; and
   a controller electrically coupled to the module.

18. An apparatus as recited in claim 17, wherein the controller is configured to select the inner array according to a legacy mode of operation, perform track following using the inner servo readers, and transduce data in a single data band of a magnetic recording tape using only the inner array.

19. An apparatus, comprising:
   an inner array of data transducers on a module, the data transducers of the inner array being aligned along a common axis that extends between distal ends of the module;
   two outer arrays of data transducers positioned to sandwich the inner array therebetween;
   inner servo readers positioned between the inner array and the outer arrays; and
   outer servo readers positioned toward outer ends of the outer arrays,
   wherein widths of at least some of the outermost data transducers in the inner array are less than widths of at least some of the innermost data transducers in the inner array,
   a drive mechanism for passing a magnetic medium over the module; and
   a controller electrically coupled to the module,
   wherein the controller is configured to simultaneously transduce data on two data bands of a magnetic recording tape using all of the arrays, and perform track following using at least the outer servo readers.

20. A method, comprising:
   passing a magnetic recording tape having a plurality of data bands over a module having:
      an inner array of data transducers on a module, the inner array being aligned along a common axis that extends between distal ends of the module,
      two outer arrays of data transducers positioned to sandwich the inner array therebetween,
      inner servo readers positioned between the inner array and the outer arrays, and outer servo readers positioned toward outer ends of the outer arrays, wherein widths of at least some of the outermost data transducers in the inner array are less than widths of at least some of the innermost data transducers in the inner array; and simultaneously transducing data on two of the data bands using the data transducers of the inner and outer arrays.

\* \* \* \* \*